(12) United States Patent
Zhu et al.

(10) Patent No.: US 12,433,244 B2
(45) Date of Patent: Oct. 7, 2025

(54) FENCE FOR ENTRY STAIR OF MOTORHOME

(71) Applicant: Guangzhou Mibo Zhilian Technology Co. LTD, Guangzhou (CN)

(72) Inventors: Qiaoduo Zhu, Guangzhou (CN); Ziyi Long, Beijing (CN)

(73) Assignee: Guangzhou Mibo Zhilian Technology Co. LTD, Guangzhou (CN)

( * ) Notice: Subject to any disclaimer, the term of this patent is extended or adjusted under 35 U.S.C. 154(b) by 40 days.

(21) Appl. No.: 18/930,941

(22) Filed: Oct. 29, 2024

(65) Prior Publication Data
US 2025/0275516 A1    Sep. 4, 2025

(30) Foreign Application Priority Data

Feb. 29, 2024  (CN) .......................... 202420394804.3

(51) Int. Cl.
*A01K 1/035*  (2006.01)

(52) U.S. Cl.
CPC .................................... *A01K 1/035* (2013.01)

(58) Field of Classification Search
CPC .. A01K 1/035; A01K 3/001; E06B 2009/002; E06B 7/32; E04H 17/185; B60P 3/32–39
USPC .................................. 119/416; 296/156–176
See application file for complete search history.

(56) References Cited

U.S. PATENT DOCUMENTS

| | | | | |
|---|---|---|---|---|
| 3,726,256 A | * | 4/1973 | Bernhardt | B60P 3/04 280/30 |
| 5,097,796 A | * | 3/1992 | Reimers | A01K 1/035 119/481 |
| 5,167,202 A | * | 12/1992 | Bradford | A01K 1/035 119/484 |
| 5,522,344 A | * | 6/1996 | Demurjian | A01K 1/035 119/474 |
| 6,467,433 B1 | * | 10/2002 | Stanton | B60P 3/04 119/512 |
| 9,260,910 B1 | * | 2/2016 | Flannery | E06B 9/02 |
| 11,066,870 B1 | * | 7/2021 | Flannery | A01K 1/035 |
| 11,091,363 B1 | * | 8/2021 | Martin | F16L 33/02 |
| 2004/0188667 A1 | * | 9/2004 | Ray | E04H 17/18 256/67 |
| 2004/0194725 A1 | * | 10/2004 | Ozeri | A01K 1/033 119/484 |
| 2006/0107901 A1 | * | 5/2006 | Hirokawa | A01K 1/0005 119/452 |

(Continued)

OTHER PUBLICATIONS

FXW, "FXW—Instant Dog Playpen for RV Trips", 2021, URL: <https://fxw.life/products/instant-dog-playpen-for-rv-trips>. Accessed online: Dec. 10, 2024 (Year: 2021).*

*Primary Examiner* — Zoe Tam Tran

(57) ABSTRACT

The present disclosure proposes a fence for an entry stair of a motorhome, the fence including: two first blocking bodies; and a connecting frame located between the two first blocking bodies, the connecting frame having two connecting posts and a plurality of blocking tubes, wherein the two connecting posts are spaced apart from each other along left and right sides of the connecting frame, each of the connecting posts is connected to a corresponding one of the first blocking bodies, and each of the connecting posts is provided with a plurality of connecting portions which are arranged spaced apart from each other in a height direction of the connecting post.

6 Claims, 6 Drawing Sheets

(56) References Cited

U.S. PATENT DOCUMENTS

| | | | |
|---|---|---|---|
| 2007/0000448 A1* | 1/2007 | Dietz | A01K 1/033 119/481 |
| 2008/0110413 A1* | 5/2008 | Kobayashi | A01K 1/035 119/514 |
| 2008/0217898 A1* | 9/2008 | Hanscom | B60P 3/36 280/763.1 |
| 2009/0031964 A1* | 2/2009 | Proxmire | A01K 1/034 220/919 |
| 2011/0001106 A1* | 1/2011 | Lee | A01K 1/035 256/73 |
| 2012/0145087 A1* | 6/2012 | Nichols | A01K 1/035 119/474 |
| 2012/0223283 A1* | 9/2012 | Kobayashi | A01K 1/034 256/26 |
| 2016/0192616 A1* | 7/2016 | Kitchen | A01K 1/034 119/485 |
| 2016/0230448 A1* | 8/2016 | Han | E06B 9/0692 |
| 2018/0249675 A1* | 9/2018 | Fleming | A01K 1/034 |
| 2019/0174709 A1* | 6/2019 | Niemela | A01K 1/0035 |
| 2020/0305386 A1* | 10/2020 | Niemela | A01K 1/0035 |
| 2020/0386049 A1* | 12/2020 | Kaiser | E06B 9/04 |
| 2021/0289742 A1* | 9/2021 | Liang | F16B 5/0092 |
| 2023/0337626 A1* | 10/2023 | Chen | E04H 17/185 |

* cited by examiner

FENCE FOR ENTRY STAIR OF MOTORHOME

TECHNICAL FIELD

The present disclosure relates to a fence and, in particular, to a fence for an entry stair of a motorhome.

BACKGROUND ART

When camping, in order to allow a pet to move freely in a motorhome and to prevent it from running around outdoors, a fence is generally arranged at an entry stair of the motorhome to ensure that the pet can not only move freely in the motorhome, but can also move freely in an outdoor area enclosed by the fence and the motorhome, thereby increasing the space for the pet to move around.

SUMMARY

Embodiments of the present disclosure provide a fence for an entry stair of a motorhome. The technical solutions thereof are as follows.

The fence includes:

two first blocking bodies configured to be arranged on left and right sides of the entry stair of the motorhome; and a connecting frame configured to be arranged in front of the entry stair of the motorhome, the connecting frame being located between the two first blocking bodies, and the connecting frame having two connecting posts and a plurality of blocking tubes, wherein the two connecting posts are spaced apart from each other along left and right sides of the connecting frame, each of the connecting posts is connected to a corresponding one of the first blocking bodies, and each of the connecting posts is provided with a plurality of connecting portions which are arranged spaced apart from each other in a height direction of the connecting post; and the number of blocking tubes and the number of connecting portions on the same connecting post are the same, a first end in a length direction of each blocking tube and a corresponding connecting portion on one of the connecting posts are removably connected together, and a second end in the length direction of the blocking tube and a corresponding connecting portion on the other of the connecting posts are removably connected together.

The above description is merely presented for the purpose of the specification, and is not intended to limit the present disclosure in any way. Except for the above illustrative aspects, implementations and features, further aspects, implementations and features of the present disclosure will become readily apparent with reference to the accompanying drawings and the following detailed description.

BRIEF DESCRIPTION OF THE DRAWINGS

In figures, the same reference signs denote the same or similar components or elements throughout multiple figures unless otherwise specified. These figures are not necessarily drawn to scale. It should be understood that these accompanying drawings depict only some implementations disclosed in the present disclosure and should not be construed as limiting the scope of the present disclosure.

Figure 1:
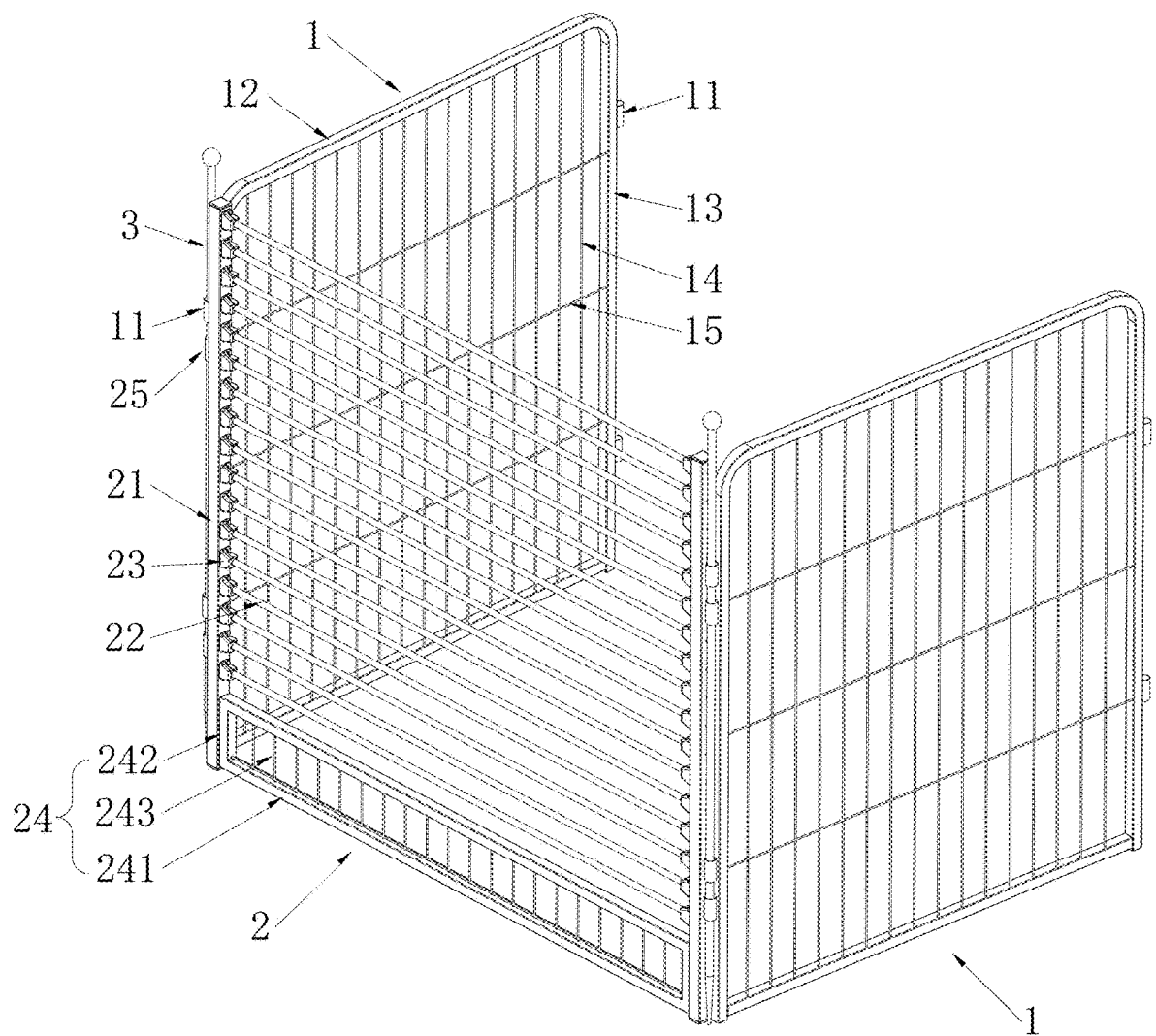
FIG. 1 is a schematic perspective view of the structure of a fence for an entry stair of a motorhome of the present disclosure in a first state.

LIST OF REFERENCE SIGNS 1. first blocking body; 11. second connecting sleeve; 12. second horizontal beam; 13. second vertical beam; 14. second vertical blocking bar; 15. horizontal blocking bar; 2. connecting frame; 21. connecting post; 22. blocking tube; 23. connecting portion; 231. engagement groove; 2311. engagement section; 23111. first section; 23112. second section; 2312. opening; 24. second blocking body; 241. first horizontal beam; 242. first vertical beam; 243. first vertical blocking bar; 25. first connecting sleeve; 3. insertion bar.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present disclosure. Therefore, the accompanying drawings and the description are considered as exemplary in nature rather than limiting.

Referring to FIGS. 1-6, a fence for an entry stair of a motorhome according to a preferred implementation of the present disclosure is shown, which includes:

two first blocking bodies 1, the two first blocking bodies 1 being configured to be arranged on left and right sides of the entry stair of the motorhome; and a connecting frame 2, the connecting frame 2 being arranged in front of the entry stair of the motorhome. Where the two first blocking bodies 1 are arranged on the left and right sides of the entry stair of the motorhome, the connecting frame 2 and the two first blocking bodies 1 are arranged around a part of the motorhome having the entry stair and are located outside the entry stair, to define an outdoor area for pet activity together with the part. The connecting frame 2 is located between the two first blocking bodies 1, and the connecting frame 2 has two connecting posts 21 and a plurality of blocking tubes 22.

The two connecting posts 21 are spaced apart from each other along the left and right sides of the connecting frame 2, each of the connecting posts 21 is connected to a corresponding one of the first blocking bodies 1, and each of the connecting posts 21 is provided with a plurality of connecting portions 23. The plurality of connecting portions 23 are arranged spaced apart from each other in a height direction of the connecting post 21.

The number of blocking tubes 22 and the number of connecting portions 23 on the same connecting post 21 are the same, a first end in a length direction of each blocking tube 22 and a corresponding connecting portion 23 on one of the connecting posts 21 are removably connected together, and a second end in the length direction of the blocking tube 22 and a corresponding connecting portion 23 on the other of the connecting posts 21 are removably connected together.

In the fence for an entry stair of a motorhome of the present disclosure, since the connecting posts 21 of the connecting frame 2 are each provided with a plurality of connecting portions 23 and the blocking tubes 22 and the connecting portions 23 are removably connected together, an adaptive number of blocking tubes 22 can be mounted according to the height or form of the entry stair of the motorhome, and thus can be adapted to different heights or different forms of entry stairs of the motorway. For example, depending on the different structures of the entry stairs of the motorway, the number of blocking tubes 22 and the mounting positions thereof on the connecting portions 23 are adjusted to prevent a pet (such as a dog) from coming out of the fence. The removable connection between the blocking tubes 22 and the connecting portions 23 has a wider range of applications, can reduce production and transportation costs, and is more conducive to the promotion and application of the fence for an entry stair of a motorhome.

Referring to FIGS. 3-6, in an implementation, each connecting portion 23 includes an engagement groove 231. The engagement groove 231 is engaged with a corresponding blocking tube 22. In this way, the blocking tube 22 can be removably mounted on the connecting portion 23 by fitting the blocking tube 22 with the engagement groove 231, so that the connection reliability is high, and tool-less disassembly and disassembly can be achieved, making disassembly and assembly more convenient.

Figure 6:
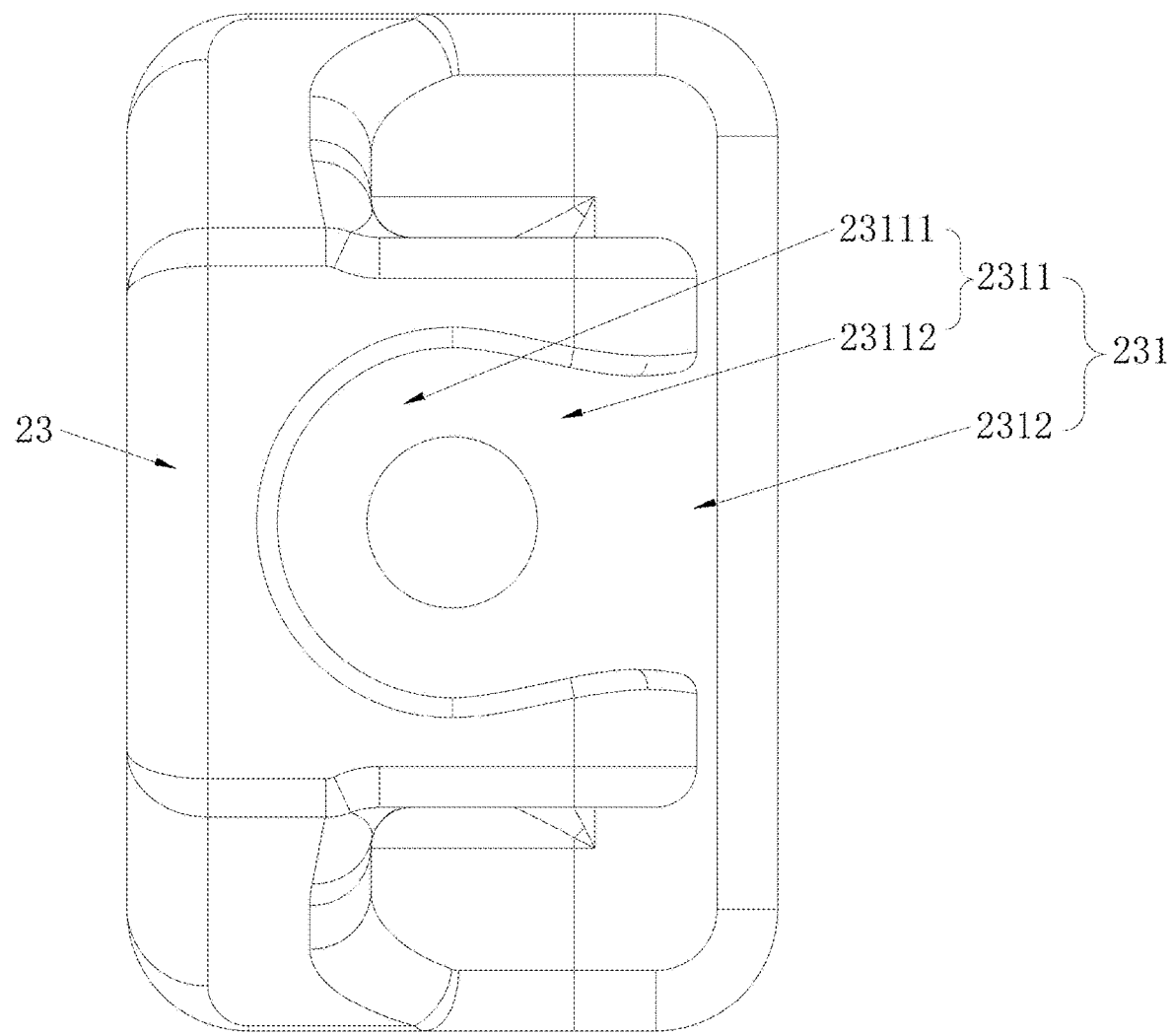
FIG. 6 is a schematic perspective view of the structure of the connecting portion of the present disclosure from a second perspective.

Referring to FIG. 6, specifically, in an implementation, the engagement groove 231 includes:
  an engagement section 2311, the engagement section 2311 being engaged with the corresponding blocking tube 22; and
  an opening 2312, the opening 2312 being in communication with the engagement section 2311 and located on a side of the connecting portion 23. The opening 2312 can allow the blocking tube 22 to radially enter and exit the engagement section 2311. That is, by allowing the blocking tube 22 to be mounted or dismounted in a radial direction of the engagement groove 231, the blocking tube 22 can be mounted or dismounted, with a simpler operation and more convenient mounting and dismounting.

Referring to FIG. 6, more specifically, in an implementation, the engagement section 2311 includes a first section 23111 and a second section 23112. The first section 23111 and the second section 23112 are arranged in sequence in the radial direction of the engagement groove 231. The inner diameter of the first section 23111 is greater than the outer diameter of the blocking tube 22, the second section 23112 is located between the first section 23111 and the opening 2312, and the inner diameter of the second section 23112 gradually decreases from one side close to the first section 23111 toward the other side close to the opening 2312. In this way, where the end of the blocking tube 22 is mounted in the engagement groove 231, the end of the blocking tube 22 can be limited by the second section 23112, so that the end of the blocking tube 22 is prevented from being disengaged from the engagement groove 231, providing a better retaining effect on the blocking tube 22 and a higher structural reliability. In addition, since the inner diameter of the first section 23111 is greater than the outer diameter of the blocking tube 22, a certain amount of moving space can be provided for the end of the blocking tube 22, making it easier to mount and dismount the blocking tube 22, thereby helping to improve the convenience of mounting and dismounting of the blocking tube 22.

In other implementations, the connecting portion 23 includes a threaded hole, and the end of the blocking tube 22 is provided with a connecting hole. The connecting hole and the threaded hole are connected together via a bolt.

In other implementations, the connecting portion 23 includes a female fastener, and the end of the blocking tube 22 is provided with a male fastener. The male fastener and the female fastener are fastened together.

Figure 2:
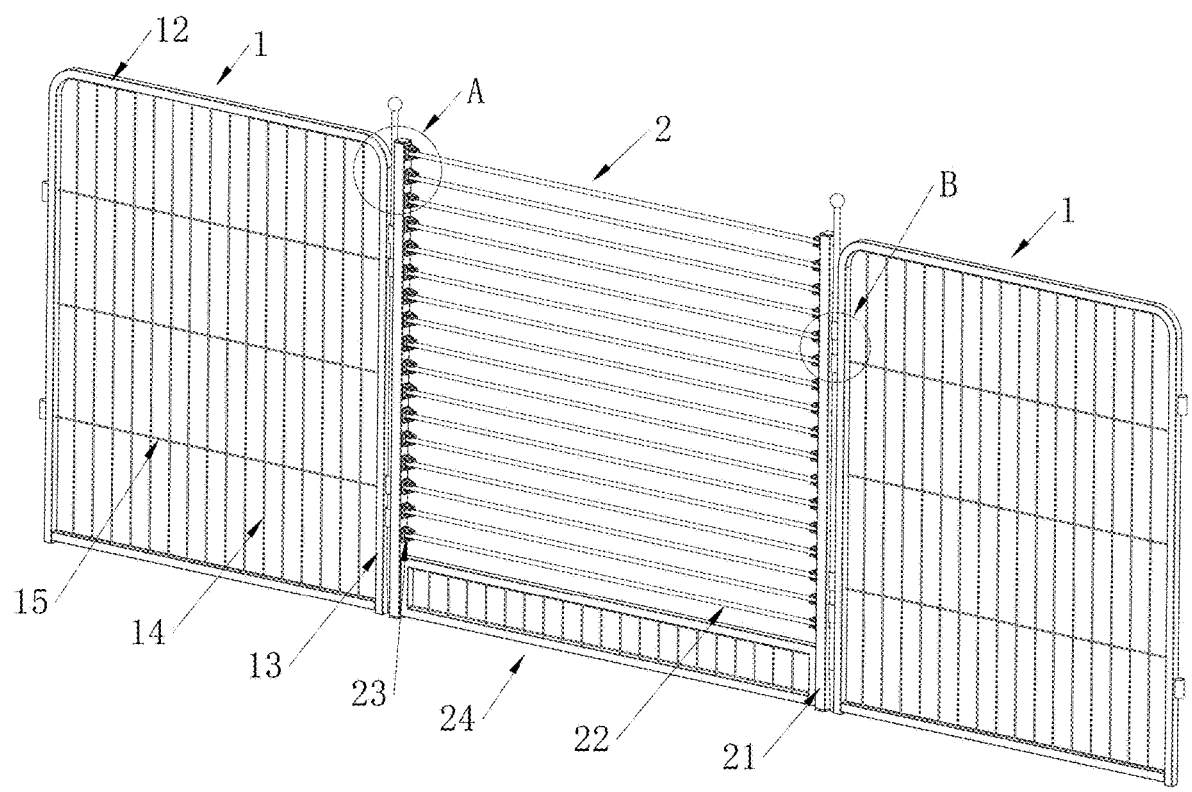
FIG. 2 is a schematic perspective view of the structure of the fence for an entry stair of a motorhome of the present disclosure in a second state.
Figure 3:
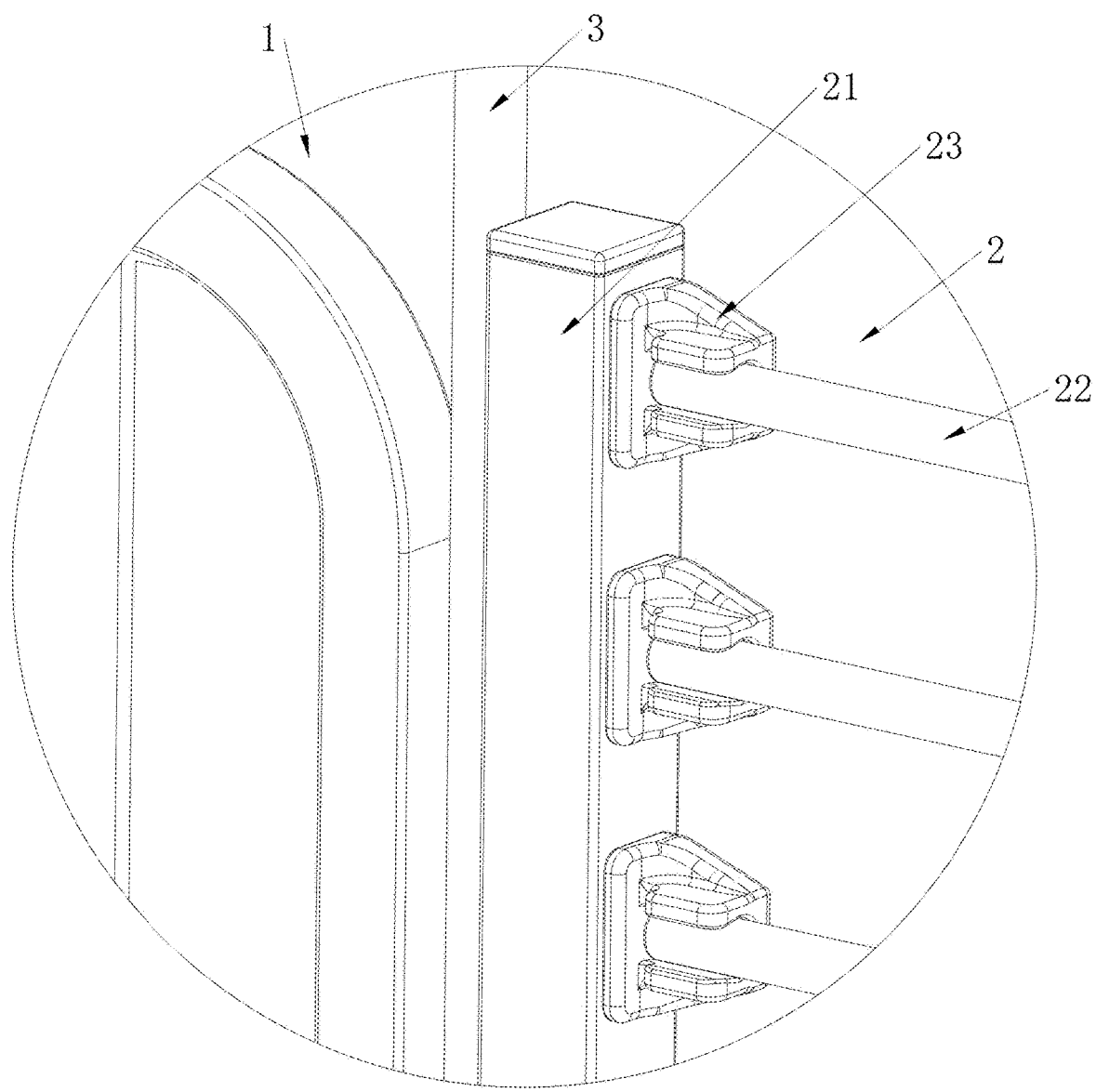
FIG. 3 is a partial enlarged view of part A in FIG. 2.
Figure 4:
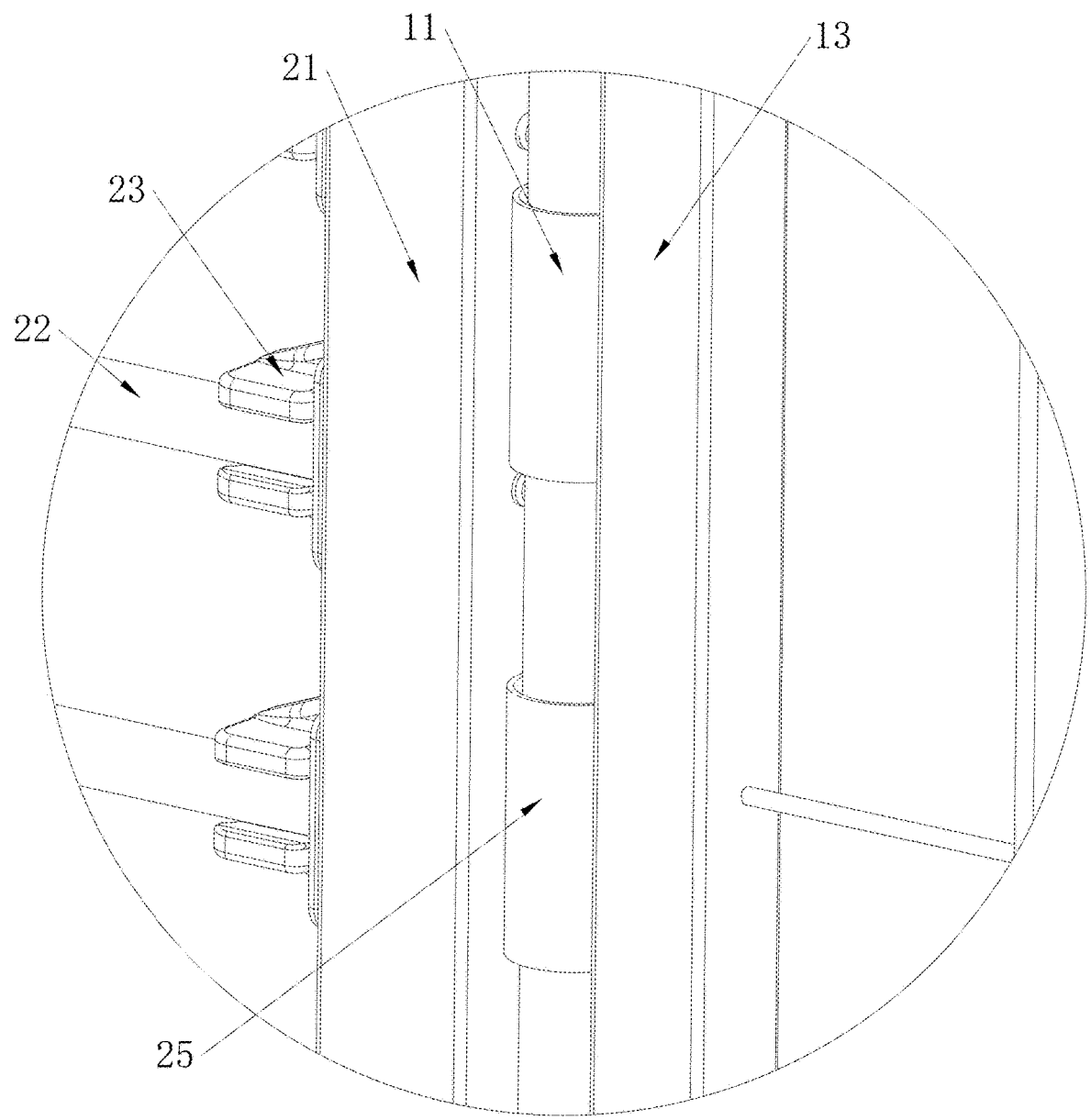
FIG. 4 is a partial enlarged view of part B in FIG. 2.
Figure 5:
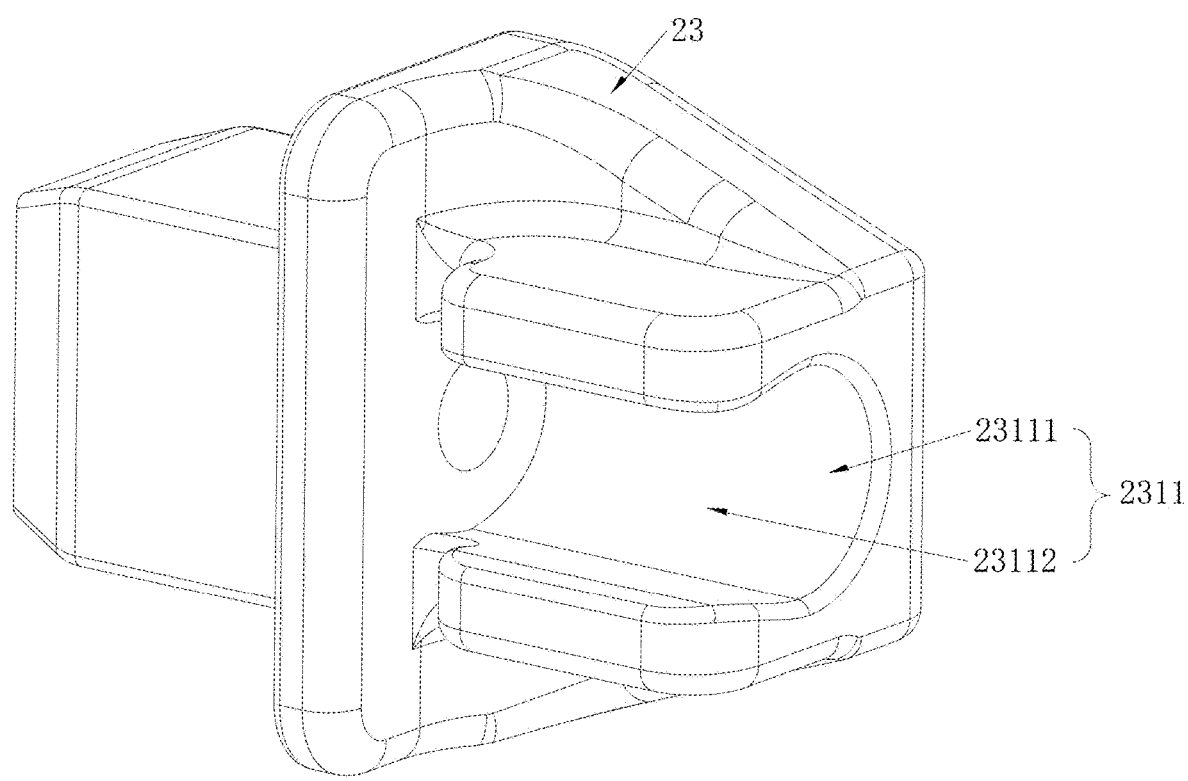
FIG. 5 is a schematic perspective view of the structure of a connecting portion of the present disclosure from a first perspective.

Referring to FIGS. 1-2, in an implementation, the connecting frame 2 is further provided with a second blocking body 24. The second blocking body 24 is located at a bottom of the connecting frame 2 and below the connecting portions 23. A first end in a length direction of the second blocking body 24 is connected to one of the connecting posts 21, a second end in the length direction of the second blocking body 24 is connected to the other of the connecting posts 21, and the second blocking body 24 is configured to prevent a pet from coming out of the bottom of the connecting frame 2. In this way, the two connecting posts 21 can be connected to each other via the second blocking body 24 to form the integral structure of the connecting frame 2, with a high structural strength, so that the structural stability of the connecting frame 2 is improved. In addition, the second blocking body 24 can be used to block a large gap in a position where the bottom of the connecting frame 2 is located, to prevent the pet from coming out of the bottom of the connecting frame 2, so that the structural reliability is higher.

Referring to FIG. 1, specifically, in an implementation, the second blocking body 24 includes:
  two first horizontal beams 241, the first horizontal beams 241 extending in a left-right direction of the connecting frame 2, and the two first horizontal beams 241 being arranged spaced apart from each other in a height direction of the connecting frame 2;
  two first vertical beams 242, the two first vertical beams 242 being arranged spaced apart from each other in a left-right direction of the second blocking body 24, each first vertical beam 242 being connected to a corresponding connecting post 21, a lower end of the first vertical beam 242 being connected to an end of a lower one of the first horizontal beams 241, and an upper end of the first vertical beam 242 being connected to an end of an upper one of the first horizontal beams 241, to form, together with the first horizontal beams 241, a frame structure having a higher structural stability; and
  a plurality of first vertical blocking bars 243, the plurality of first vertical blocking bars 243 being arranged spaced apart from each other in the left-right direction of the second blocking body 24, and the first vertical blocking bars 243 being located between the two first horizontal beams 241 and connected to the two first horizontal beams 241. In this way, the second blocking body 24 is formed into an openwork structure having a good structural strength, which is not easily deformable and can provide a sufficient field of vision for the pet, and good ventilation is also ensured.

In other implementations, the second blocking body 24 may be a plate-like structure.

In an implementation, each connecting post 21 is hinged to the corresponding first blocking body 1 such that the first blocking body 1 can rotate relative to the connecting frame 2, so that the first blocking body 1 can be folded to be close to the connecting frame 2 or unfolded to be perpendicular or at an inclination angle to the connecting frame 2, facilitating handling and storage of the fence for an entry stair of a motorhome, and also making it easier to arrange the first blocking body 1 on one of the left and right sides of the entry stair of the motorhome.

Referring to FIGS. 1-2, in an implementation, the fence for an entry stair for a motorhome further includes an insertion bar 3. The insertion bar 3 is configured to be removably inserted into the ground.

Each connecting post 21 is provided with a first connecting sleeve 25. A central hole of the first connecting sleeve 25 is rotatably fitted with the insertion bar 3.

Each first blocking body 1 is provided with a second connecting sleeve 11. The second connecting sleeve 11 and the adjacent first connecting sleeve 25 are arranged spaced apart from each other in a height direction of the first blocking body 1, and a central hole of the second connecting sleeve 11 is rotatably fitted with the insertion bar 3. By making both the central hole of the first connecting sleeve 25 and the central hole of the second connecting sleeve 11 rotatably fitted with the insertion bar 3, the connecting post 21 and the first blocking body 1 are hinged together, so that the connection reliability is high, and the structure is simple and practical. In addition, by inserting the insertion bar 3 into the ground, the fence for an entry stair of a motorhome can be reliably erected on the ground, and the fence for an entry stair of a motorhome can then be reliably maintained in a state of surrounding the outside of the entry stair of the motorhome, and thus can effectively block the pet from running outside.

In an implementation, there are two first connecting sleeves 25 and also two second connecting sleeves 11. The two first connecting sleeves 25 are arranged spaced apart from each other in the height direction of the connecting post 21, and the two second connecting sleeves 11 are arranged spaced apart from each other in the height direction of the first blocking body 1. In this way, it is possible to improve the hinge stability between the connecting frame 2 and the first blocking body 1, so that the first blocking body 1 rotates more smoothly.

In other implementations, the number of first connecting sleeves 25 and the number of second connecting sleeves 11 may each be one or three or more.

In an implementation, the insertion bar 3 is removably inserted into the central hole of the first connecting sleeve 25 and the central hole of the second connecting sleeve 11, so that the insertion bar 3 can be removed from the central hole of the first connecting sleeve 25 and the central hole of the second connecting sleeve 11, and the connecting frame 2 and the first blocking body 1 can be disassembled, making it easier to handle and store the fence for an entry stair of a motorhome.

In an implementation, the first blocking body 1 is provided with second connecting sleeves 11 on both left and right sides. The central hole of the second connecting sleeve 11 on the side of the first blocking body 1 away from the connecting frame 2 is inserted into and fitted with a further insertion bar 3. By means of this insertion bar 3, the side of the first blocking body 1 away from the connecting frame 2 is fixed to the ground, so that the mounting stability of the fence for an entry stair of a motorhome can be improved, and the structural reliability is higher.

In an implementation, a lower end of the insertion bar 3 has a guide portion. The outer diameter of the guide portion gradually decreases from top to bottom, and the guide portion is configured to guide the insertion of the lower end of the insertion bar 3 into the ground, to reduce the insertion difficulty of the insertion bar 3.

Referring to FIGS. 1-2, specifically, in an implementation, the first blocking body 1 includes:
two second horizontal beams 12, the second horizontal beams 12 extending in a left-right direction of the first blocking body 1, and the two second horizontal beams 12 being arranged spaced apart from each other in a height direction of the first blocking body 1;
two second vertical beams 13, the two second vertical beams 13 being spaced apart from each other in the left-right direction of the first blocking body 1, the lower end of each second vertical beam 13 being connected to an end of a lower one of the second horizontal beams 12, and an upper end of the second vertical beam 13 being connected to an end of an upper one of the second horizontal beams 12, to form, together with the second horizontal beams 12, a frame structure having a higher structural stability;
a plurality of second vertical blocking bars 14, the plurality of second vertical blocking bars 14 being arranged spaced apart from each other in the left-right direction of the first blocking body 1, and the second vertical blocking bars 14 being located between the two second horizontal beams 12 and connected to the two second horizontal beams 12; and
a plurality of horizontal blocking bars 15, the plurality of horizontal blocking bars 15 being arranged spaced apart from each other in the height direction of the first blocking body 1, and the horizontal blocking bars 15 being located between the two second vertical beams 13 and connected to the two second vertical beams 13. In this way, the first blocking body 1 is formed into an openwork structure having a good structural strength, which is not easily deformable and can provide a sufficient field of vision for the pet, and good ventilation is also ensured.

In other implementations, the first blocking body 1 may be a plate-like structure.

In an implementation, the first blocking bodies 1, the connecting frame 2 and the insertion bars 3 are all structures made of a hard metal material so that the first blocking bodies 1, the connecting frame 2 and the insertion bars 3 all have a good structural strength, thereby improving the structural stability, and preventing deformation, of the fence for an entry stair of a motorhome.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the present disclosure, the meaning of "a plurality of" is two or more, unless explicitly and specifically defined otherwise.

The above descriptions are merely specific implementations of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. Fence for an entry stair of a motorhome, the fence comprising:
   two first blocking bodies configured to be arranged on left and right sides of the entry stair of the motorhome; and
   a connecting frame configured to be arranged in front of the entry stair of the motorhome, the connecting frame being located between the two first blocking bodies, and the connecting frame having two connecting posts and a plurality of blocking tubes,
   wherein the two connecting posts are spaced apart from each other along left and right sides of the connecting frame, each of the connecting posts is connected to a corresponding one of the first blocking bodies, and each of the connecting posts is provided with a plurality of connecting portions which are arranged spaced apart from each other in a height direction of the connecting post; and
   wherein the number of blocking tubes and the number of connecting portions on the same connecting post are the same, a first end in a length direction of each blocking tube and a corresponding connecting portion on one of the connecting posts are removably connected together, and a second end in the length direction of the blocking tube and a corresponding connecting portion on the other of the connecting posts are removably connected together;
   wherein the connecting portion comprises an engagement groove engaged with the corresponding blocking tube;
   wherein the engagement groove comprises an engagement section engaged with the corresponding blocking tube, and an opening in communication with the engagement section and located on a side of the connecting portion, the opening being capable of allowing the blocking tube to radially enter and exit the engagement section;
   wherein the engagement section comprises a first section and a second section, the first section and the second section being arranged in sequence in a radial direction of the engagement groove, the inner diameter of the first section being greater than the outer diameter of the blocking tube, the second section being located between the first section and the opening, and the inner diameter of the second section gradually decreasing from one side close to the first section toward the other side close to the opening.

2. He fence for an entry stair of a motorhome according to claim 1, wherein the connecting frame is further provided with a second blocking body located at a bottom of the connecting frame and below the connecting portions, a first end in a length direction of the second blocking body being connected to one of the connecting posts, a second end in the length direction of the second blocking body being con-nected to the other of the connecting posts, and the second blocking body being configured to prevent a pet from coming out of the bottom of the connecting frame.

3. He fence for an entry stair of a motorhome according to claim 2, wherein the second blocking body comprises:
   two first horizontal beams extending in a left-right direction of the connecting frame, the two first horizontal beams being arranged spaced apart from each other in a height direction of the connecting frame;
   two first vertical beams arranged spaced apart from each other in a left-right direction of the second blocking body, each first vertical beam being connected to a corresponding connecting post, and having a lower end connected to an end of a lower one of the first horizontal beams, and an upper end connected to an end of an upper one of the first horizontal beams; and
   a plurality of first vertical blocking bars arranged spaced apart from each other in the left-right direction of the second blocking body, the first vertical blocking bars being located between the two first horizontal beams and connected to the two first horizontal beams.

4. He fence for an entry stair of a motorhome according to claim 1, wherein each connecting post is hinged to the corresponding first blocking body such that the first blocking body can rotate relative to the connecting frame.

5. The fence for an entry stair of a motorhome according to claim 4, further comprising an insertion bar configured to be removably inserted into the ground, wherein each connecting post is provided with a first connecting sleeve, a central hole of the first connecting sleeve being rotatably fitted with the insertion bar; and
   each first blocking body is provided with a second connecting sleeve, the second connecting sleeve and the first connecting sleeve being arranged spaced apart from each other in a height direction of the first blocking body, and a central hole of the second connecting sleeve being rotatably fitted with the insertion bar.

6. He fence for an entry stair of a motorhome according to claim 1, wherein each first blocking body comprises:
   two second horizontal beams extending in a left-right direction of the first blocking body, the two second horizontal beams being arranged spaced apart from each other in a height direction of the first blocking body;
   two second vertical beams, the two second vertical beams being arranged spaced apart from each other in the left-right direction of the first blocking body, and each second vertical beam having a lower end connected to an end of a lower one of the second horizontal beams, and an upper end connected to an end of an upper one of the second horizontal beams;
   a plurality of second vertical blocking bars arranged spaced apart from each other in the left-right direction of the first blocking body, the second vertical blocking bars being located between the two second horizontal beams and connected to the two second horizontal beams; and
   a plurality of horizontal blocking bars arranged spaced apart from each other in the height direction of the first blocking body, the horizontal blocking bars being located between the two second vertical beams and connected to the two second vertical beams.

* * * * *